(12) United States Patent
Phillips

(10) Patent No.: US 12,290,045 B2
(45) Date of Patent: May 6, 2025

(54) DEVICES AND METHODS FOR FACILITATING CLEANING OF ANIMAL STALLS

(71) Applicant: Christopher Joe Phillips, Avon, UT (US)

(72) Inventor: Christopher Joe Phillips, Avon, UT (US)

( * ) Notice: Subject to any disclaimer, the term of this patent is extended or adjusted under 35 U.S.C. 154(b) by 31 days.

(21) Appl. No.: 18/091,080

(22) Filed: Dec. 29, 2022

(65) Prior Publication Data

US 2024/0215529 A1 Jul. 4, 2024

(51) Int. Cl.
*A01K 1/01* (2006.01)

(52) U.S. Cl.
CPC ..................... *A01K 1/01* (2013.01)

(58) Field of Classification Search
CPC .... B07B 1/30; B07B 1/36; B07B 1/38; B07B 1/005; B07B 1/06; B07B 1/28; A01K 1/01
USPC ......................................................... 209/255
See application file for complete search history.

(56) References Cited

U.S. PATENT DOCUMENTS

| | | | | |
|---|---|---|---|---|
| 3,314,539 A * | 4/1967 | Hitchman | ................. | B07B 1/38 209/415 |
| 3,825,118 A * | 7/1974 | Feller | ........................ | B07B 1/36 209/330 |
| 5,622,266 A * | 4/1997 | Curtis | ....................... | B07B 1/46 209/365.1 |
| 9,358,583 B1 * | 6/2016 | Kahn | ..................... | B07B 1/282 |
| 2017/0333949 A1 * | 11/2017 | Felton | ....................... | B07B 1/36 |
| 2022/0080462 A1 * | 3/2022 | Keesee | ..................... | B07B 1/16 |

* cited by examiner

*Primary Examiner* — Michael McCullough
*Assistant Examiner* — Jessica L Burkman
(74) *Attorney, Agent, or Firm* — LOZA & LOZA, LLP; Tyler J. Barrett

(57) ABSTRACT

Stall cleaners are adapted to facilitate separation of clean bedding material from soiled bedding and manure. According to at least one example, a stall cleaner may include a deck with a first end and a second end, the deck pivotably coupled to a frame proximate the first end. A drive mechanism may be coupled to the frame, where the drive mechanism is configured to rotate a portion of the deck proximate the second end about a circumference. Other aspects, embodiments, and features are also included.

20 Claims, 8 Drawing Sheets

DEVICES AND METHODS FOR FACILITATING CLEANING OF ANIMAL STALLS

TECHNICAL FIELD

The technology discussed below relates generally to cleaning mechanisms, and more specifically to methods and devices for facilitating cleaning of animal stalls.

BACKGROUND

In animal husbandry, it is common practice to confine animals in enclosures known variously as stalls, pens, cages, or compounds, referred to herein generically as stalls. The floors of animal stalls typically are covered with a layer of material known generally as bedding, to absorb and permit intermittent removal of animal feces and urine. Such bedding may comprise, for example, straw, wood chips, shredded wood, sawdust, clays, ground corn cobs, and the like.

Bedding becomes soiled by defecation and urination at frequent intervals and therefore must be renewed frequently. Renewal is typically performed manually by first collecting and then replacing all bedding and manure using a pitchfork having a plurality of closely-spaced tines, known generally in the art as a manure fork. The bedding and manure are placed in a wheelbarrow, bucket, or other device for removal to a dump site.

Much if not most of the removed bedding is not soiled and is still suitable for use as animal bedding. Because a significant portion of the cost of maintaining an animal in such locations is the cost of bedding, it is common practice in the art of animal husbandry during renewal of bedding to attempt to separate manure and clumps of soiled bedding from non-soiled bedding and to return the non-soiled bedding to the stall floor for further use. Experience has shown that good separation by a skilled operator can be obtained in many instances by gentle shaking or fluffing of the bedding when on the manure fork and raised from the floor, allowing the non-soiled bedding to fall between the tines while the manure clumps and bedding clumps, being larger than the inter-tine spacing, are retained on the tines for transfer to a waste receptacle such as a wheelbarrow. A skilled operator can obtain a very high percentage separation of non-soiled bedding. In equine husbandry, the manure typically is well-defined and relatively dry, and thus is quite amenable to separation.

Such a conventional process can be difficult to perfect by human operation and can be relatively time consuming, among other issues. Accordingly, devices and methods to aid in such bedding separation may be desirable.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Various examples and implementations of the present disclosure facilitate separation of clean bedding material from soiled bedding and manure. One or more examples of the present disclosure include stall cleaners. According to at least one embodiment, a stall cleaner may include a frame. A deck with a first end and a second end opposite the first end may be pivotably coupled to the frame proximate the first end of the deck, where the deck includes a plurality of openings. A drive mechanism may be coupled to the frame, where the drive mechanism is configured to rotate a portion of the deck proximate the second end about a circumference.

Additional examples of the present disclosure include cleaning device for cleaning a stall for animals. According to at least one example, a cleaning device may include a frame and a motor coupled to the frame, the motor configured to rotate a shaft about a central axis of the shaft. A deck may be coupled to the shaft at a second end of the deck, where the deck is coupled to the shaft to rotate about a predefined radius from the central axis of the shaft. A pivot arm may be pivotably coupled between the frame and the deck proximate a first end of the deck opposite from the second end.

Additional aspects of the present disclosure include methods of making stall cleaning devices. According to at least one example of such a method, a first end of a deck may be coupled to a frame to facilitate pivoting of the first end of the deck relative to the frame. A drive mechanism may also be coupled to the frame. A second end of the deck may be coupled to a portion of the drive mechanism, where the drive mechanism is configured to rotate a portion of the second end of the deck about a predefined radius.

Other aspects, features, and embodiments associated with the present disclosure will become apparent to those of ordinary skill in the art upon reviewing the following description in conjunction with the accompanying figures.

DRAWINGS

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The illustrations presented herein are, in some instances, not actual views of any particular stall cleaner or particular components of a stall cleaner, but are merely idealized representations which are employed to describe the present disclosure. Additionally, elements common between figures may retain the same numerical designation.

Figure 1:
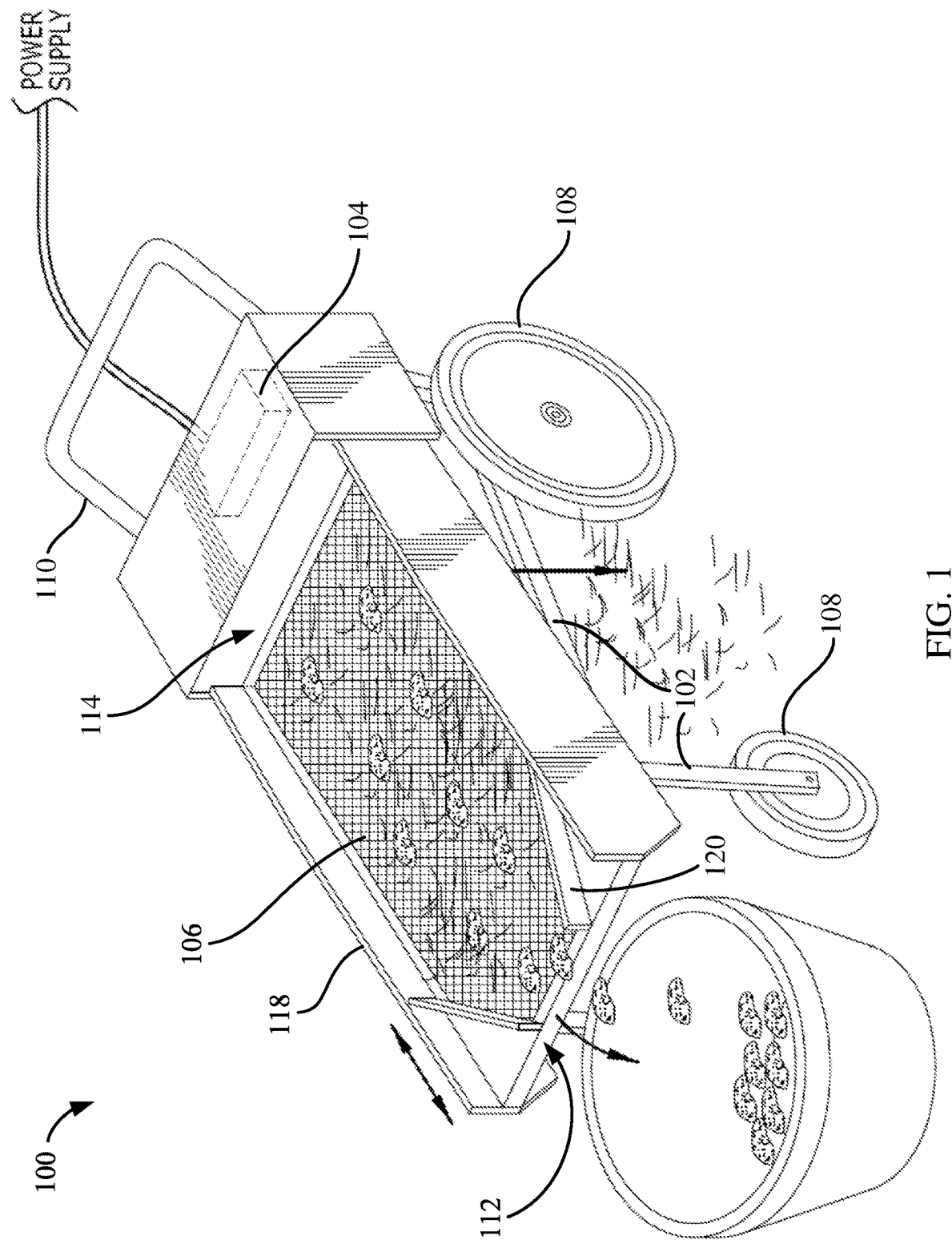
FIG. 1 is an isometric view of a stall cleaner according to at least one example.

Various embodiments of the present disclosure comprise stall cleaners. Referring to FIG. 1, an isometric view of a stall cleaner 100 is depicted according to at least one example. The stall cleaner 100 generally includes a frame 102, a drive mechanism 104, and a deck 106.

The frame 102 may be configured to support the drive mechanism 104 and the deck 106 above ground. In some embodiments, the frame 102 can include a plurality of casters 108 coupled thereto and a handle 110 to facilitate mobility of the stall cleaner 100. The frame 102 may be made of any suitable material or combination of materials, such as a metal, wood, and/or plastic material.

Figure 2:
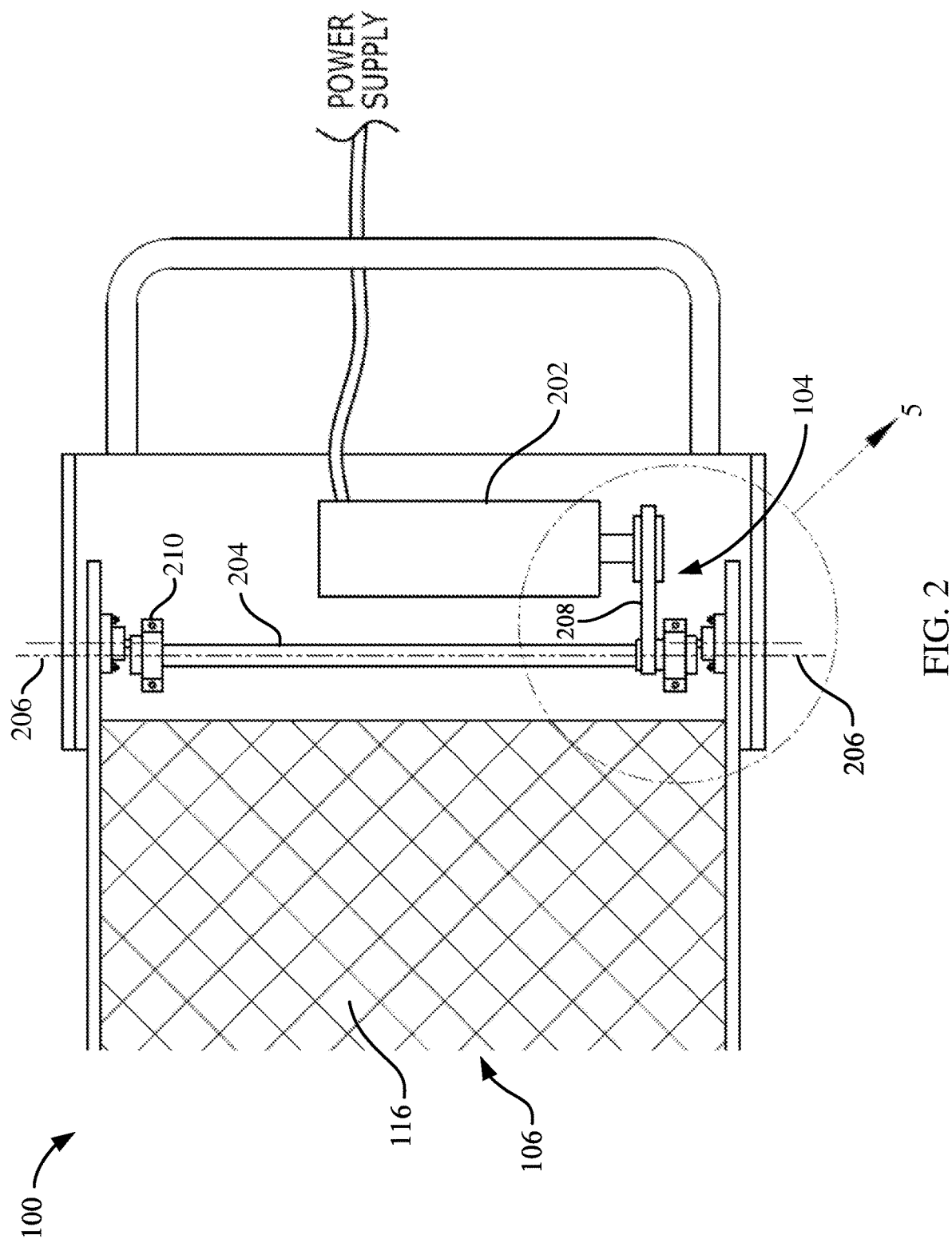
FIG. 2 is a partial top view of the stall cleaner depicting an example of the drive mechanism according to at least one embodiment.

The drive mechanism 104 may be coupled to the frame 102. FIG. 2 is a top view of a drive mechanism 104 according to at least one embodiment. As shown, the drive mechanism 104 can include a motor 202 coupled to a shaft 204 such that the motor 202 rotates the shaft 204 about a central axis 206. The motor 202 may be a gas motor or electric motor, with the specific example in FIG. 2 depicting an electric motor 202 coupled to a power supply (e.g., an electrical outlet, a battery, solar panels, etc.). In the specific example depicted, the motor 202 is coupled to the shaft 204 by coupling means 208, such as a chain, belt, or other suitable configuration. The shaft 204 is shown secured to the frame 102 by passing through bearings 210 at each longitudinal end of the shaft 204.

Referring back to FIG. 1, the deck 106 includes a first end 112 and a second end 114 opposite from the first end 112. As shown in FIG. 2, the deck 106 is formed with a plurality of openings 116. The openings 116 are configured to retain objects larger than the openings 116 on top of the deck 106 when placed thereon, and to enable objects smaller than the openings 116 to pass through. The size and shape of the plurality of openings 116 can vary based on the desired application. For example, the openings 116 in the depicted example are diamond-shaped. In other embodiments, the openings 116 may be circular, square, rectangular, etc. In at least one embodiment, the openings 116 may be rectangular-shaped with the long side of the rectangle extending substantially from the first end 112 to the second end 114 of the deck 106. In various embodiments, as shown in FIG. 1, the deck 106 may include sidewalls 118, and a funneling wall 120 to funnel objects that are retained on the deck 106 through a smaller area.

Figure 3:
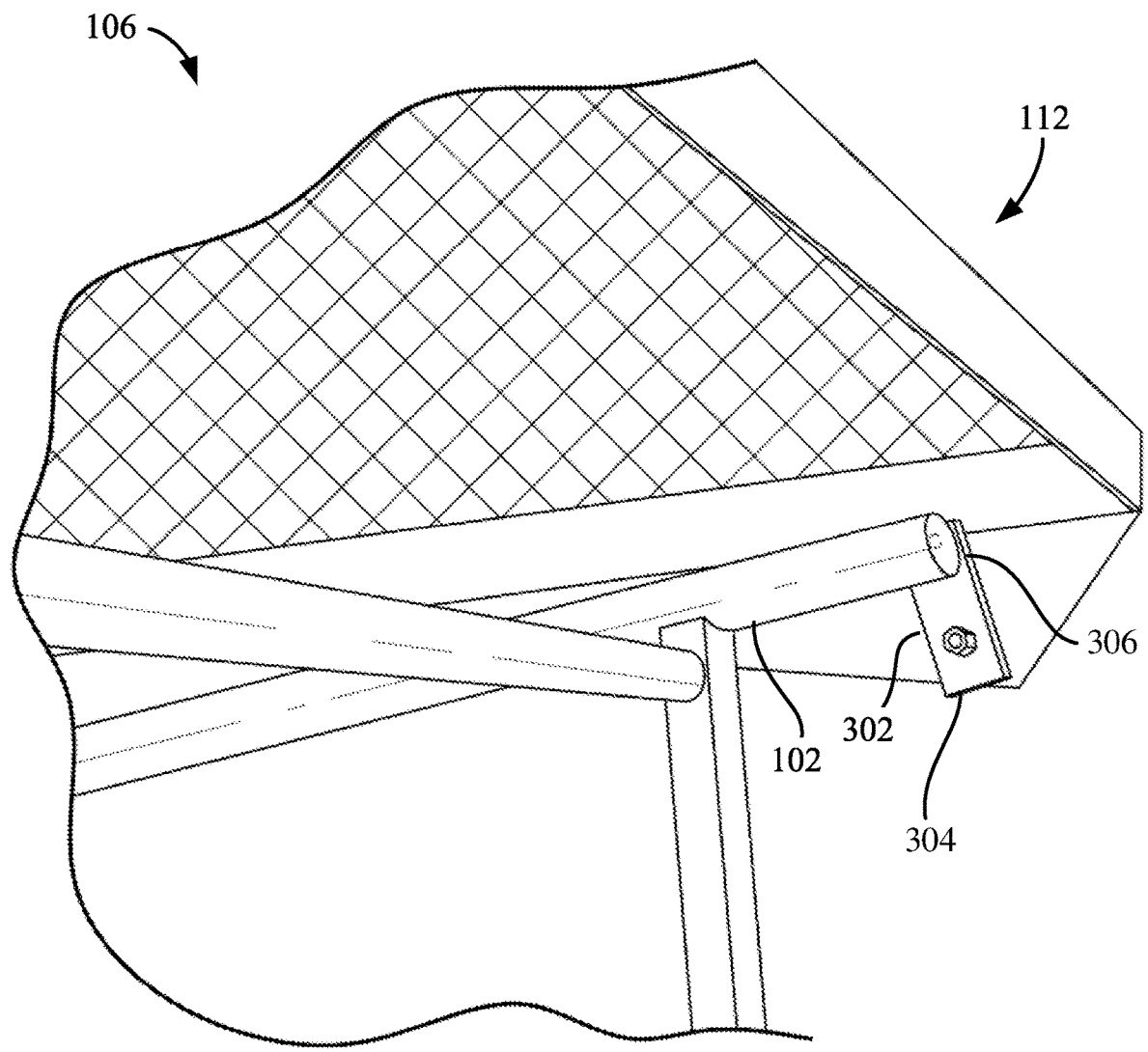
FIG. 3 is a magnified front and bottom isometric view of the deck showing the deck pivtoably coupled to the frame according to at least one example.

According to an aspect of the present disclosure, the first end 112 of the deck 106 is coupled to the frame 102 in a manner so that the first end 112 of the deck 106 may pivot relative to the frame 102. FIG. 3 is a magnified front and bottom view of the deck 106 showing the deck 106 pivtoably coupled to the frame 102. In the depicted example, the deck 106 is coupled to the frame 102 with a pivot arm 302. The pivot arm 302 includes a first longitudinal end 304 coupled to the deck 106 and a second longitudinal end 306 coupled to the frame 102.

Figure 4:
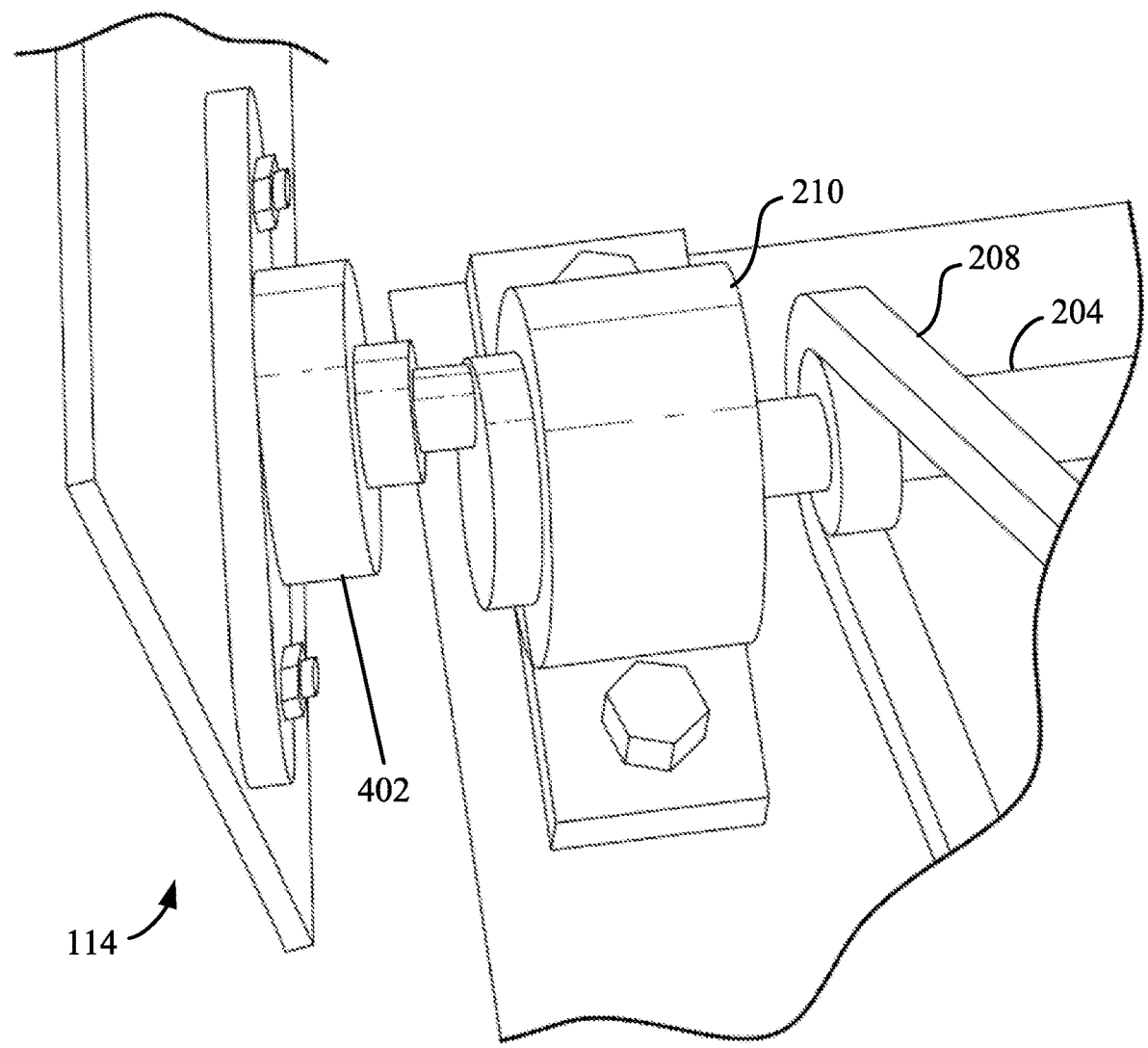
FIG. 4 is a magnified isometric view of a portion of the drive mechanism and the second end of the deck according to at least one example.
Figure 5:
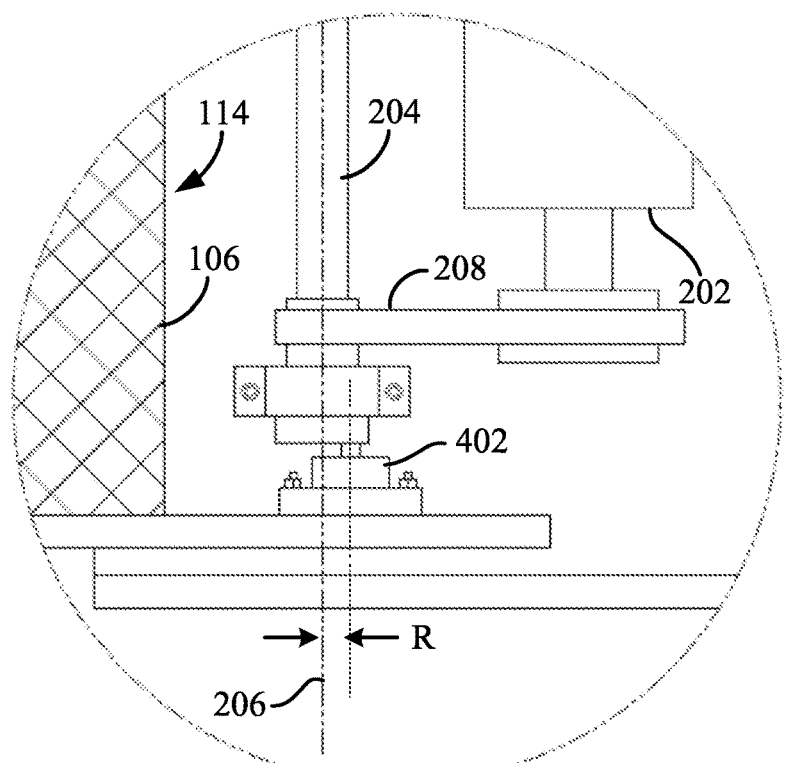
FIG. 5 is a magnified top view of a portion of the stall cleaner in FIG. 2 showing the collar rotated to the far right side of the radius "R" according to at least one example.
Figure 6:
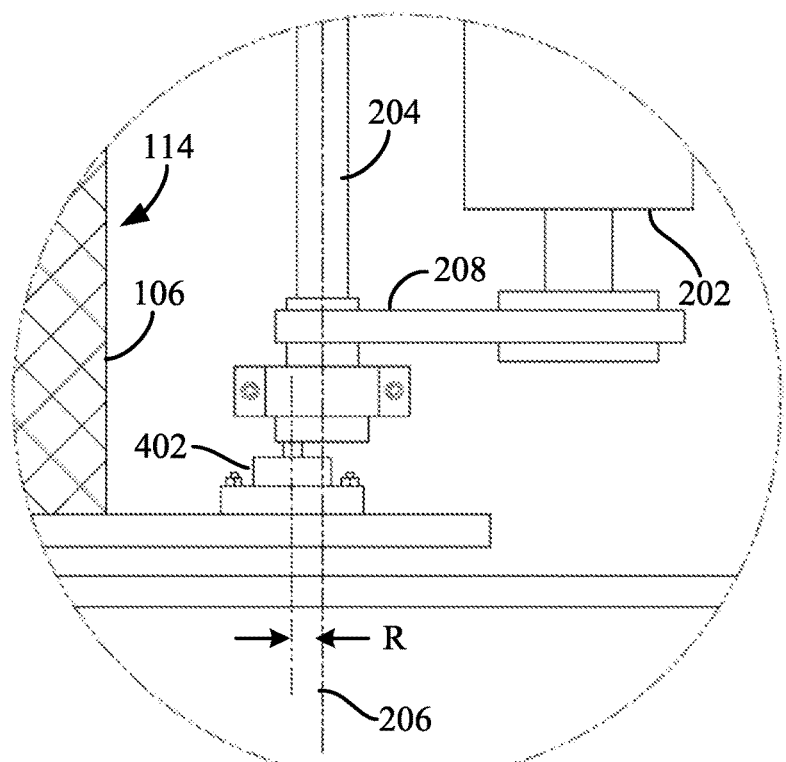
FIG. 6 is a magnified top view of a portion of the stall cleaner in FIG. 2 showing the collar rotated to the far left side of the radius "R" according to at least one example.

The deck 106 is also coupled to the shaft 204 proximate the second end 114 of the deck 106. As shown in FIG. 4, in at least one embodiment, each longitudinal end of the shaft 204 can include a collar 402 coupled to the shaft 204 so that each collar 402 rotates with the shaft 204 when the shaft 204 is rotated by the motor 202. A portion of the deck 106 proximate the second end 114 may be coupled to the collar 402. As a result, with reference to FIGS. 5 and 6, when the shaft 204 is rotated by the motor 202, the second end 114 of the deck 106 rotates around a radius "R" from the central axis 206 of the shaft 204 defined by how far from the central axis 206 the deck 106 is coupled to the collar 402. FIG. 5 shows the collar 402 rotated to the far right side of the radius "R," and FIG. 6 shows the collar 402 rotated to the far left side of the radius "R."

Figure 7:
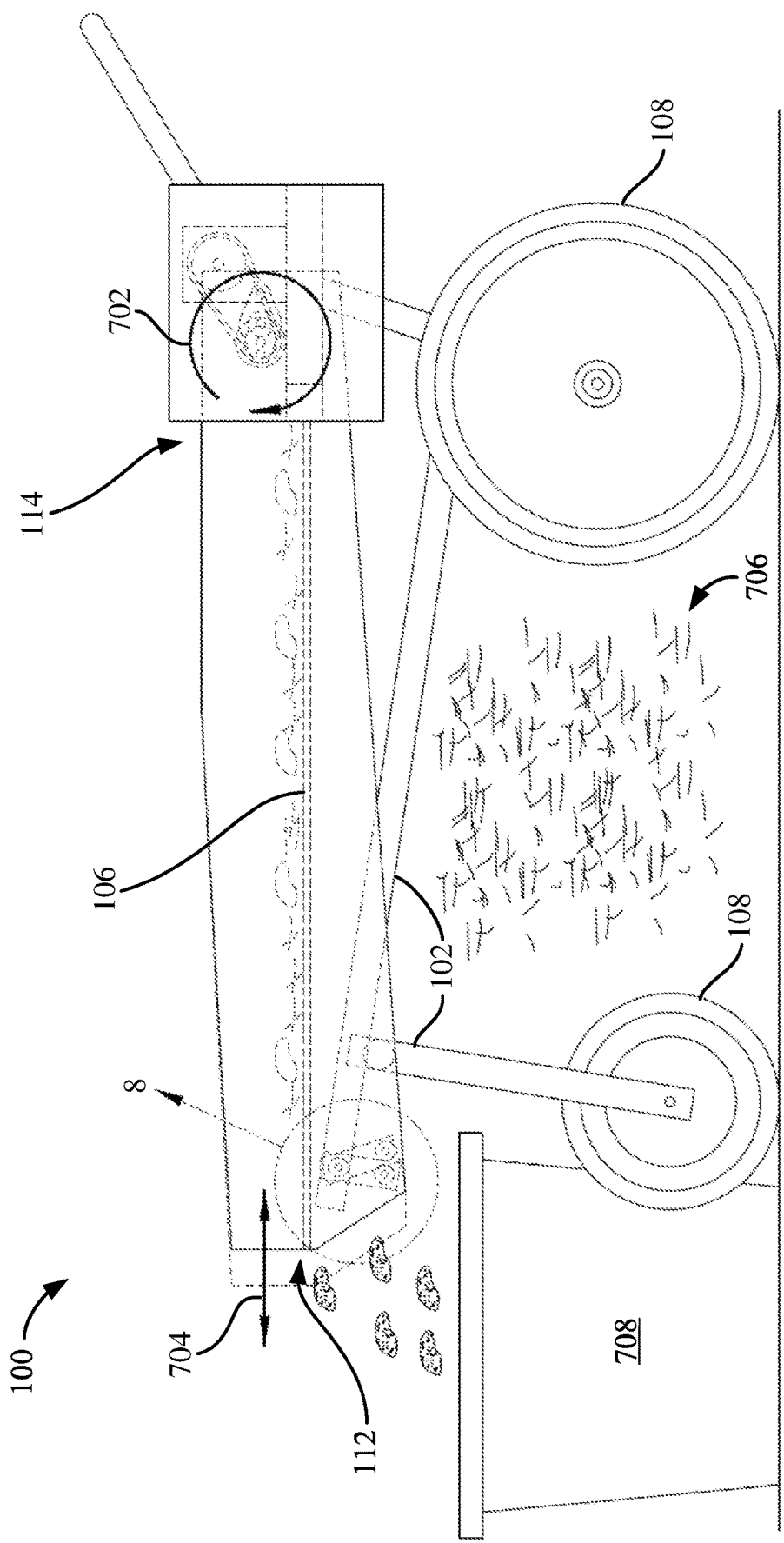
FIG. 7 is a side view of the stall cleaner depicting the operation of the stall cleaner according to at least one example.
Figure 8:
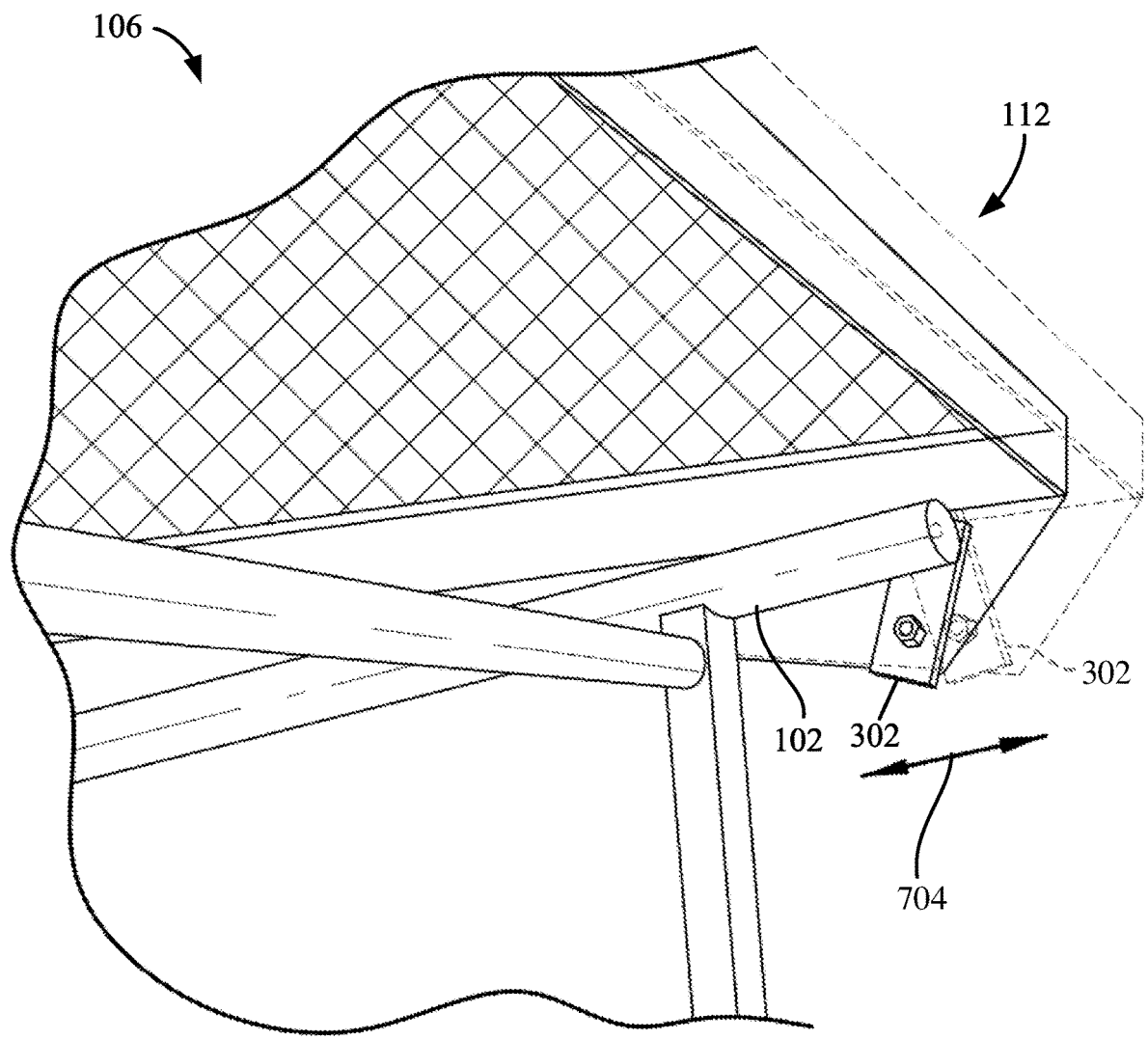
FIG. 8 is a magnified view of a portion of the first end of the deck in FIG. 7 during operation according to at least one example.

Turning now to FIG. 7, a side view of the stall cleaner 100 is shown to depict the operation of the stall cleaner 100 according to at least one example. In operation, the second end 114 of the deck 106 rotates as shown by arrow 702. As noted above, the second end 114 rotates about a circumference defined by the predefined radius from the central axis 206 of the shaft 204 when the shaft 204 is rotated by the motor 202, as depicted in FIGS. 5 and 6. The rotation of the second end 114 of the deck 106 results in the first end 112 of the deck 106 moving substantially horizontally as depicted by arrows 704. More specifically, FIG. 8 is a magnified view of a portion of the first end 112 of the deck 106 during operation. As shown, the rotation of the second end 114 of the deck 106 causes the deck 106 to pivot relative to the frame 102 at the pivot arm 302, causing the pivot arm 302 to pivot back and forth and the first end 112 of the deck 106 to move generally in the direction of the arrows 704.

Referring back to FIG. 7, a user can shovel or otherwise place the stall bedding material onto the deck 106. The relatively quick rotations of the first end 112 of the deck 106 causes the deck 106 to vibrate and move as described, resulting in a sifting of the non-soiled bedding material 706 through the openings (e.g., openings 116 in FIG. 1) to the ground beneath the stall cleaner 100. The manure clumps and soiled bedding clumps, being larger than the openings 116, are retained on the deck 106 and move toward the first end 112 of the deck 106 as a result of the vibrating motion of the deck 106 described above. The vibrating motion of the deck 106 ultimately carries the manure clumps and soiled bedding clumps off the first end 112 of the deck 106 where they can fall into a waste receptacle such as a bucket 708. Additionally, as a result of the vibrating motion of the deck 106, the deck 106 can be configured to sit at least substantially horizontal to the ground, as shown in FIG. 7, or even sloped upward from the second end 114 to the first end 112 in various embodiments, while the manure clumps and soiled bedding clumps still move along the top of the deck 106 toward the first end 112 and off the deck 106 into the waste receptacle.

Figure 9:
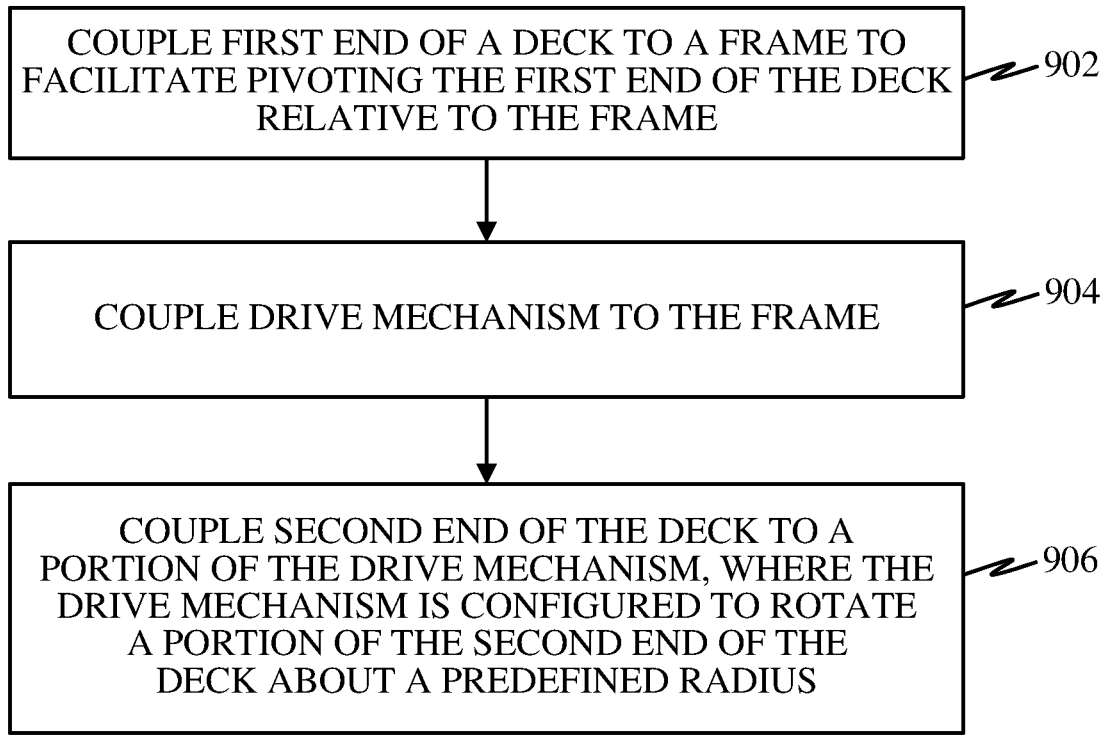
FIG. 9 is a flow diagram illustrating at least one example of a method of making a stall cleaning device.

FIG. 9 is a flow diagram illustrating at least one example of a method of making a stall cleaning device, such as the stall cleaner 100. Referring to FIGS. 1-9, the method may include a step 902 of coupling a first end 112 of a deck 106 to a frame 102 to facilitate pivoting of the first end 112 of the deck 106 relative to the frame 102. For example, the first end 112 of the deck 106 may be coupled to the frame 102 utilizing a pivot arm 302. For instance, a first longitudinal end 304 of the pivot arm 302 may be coupled proximate the first end 112 of the deck 106, and a second longitudinal end 306 of the pivot arm 302 may be coupled to the frame 102.

At 904, a drive mechanism 104 may be coupled to the frame 102. As set forth herein above, the drive mechanism 104 may include a motor 202 coupled to a shaft 204 to rotate the shaft 204 about a central axis 206 of the shaft 204. The shaft 204 may be coupled to the frame 102 with one or more bearings 210.

At 906, a second end 114 of the deck 106 may be coupled to a portion of the drive mechanism 104, such that the drive mechanism 104 rotates a portion of the second end 114 of the deck 106 about a predefined radius "R." When the second end 114 of the deck 106 rotates about the predefined radius, the pivot arm 302 may pivot at the first end 112 of the deck 106.

While the above discussed aspects, arrangements, and embodiments are discussed with specific details and particularity, one or more of the components, steps, and/or features illustrated in FIGS. 1, 2, 3, 4, 5, 6, 7, 8, and/or 9 may be rearranged and/or combined into a single component, step, or feature or embodied in several components, steps, or features. Additional elements, components, steps, and/or features may also be added or not utilized without departing from the present disclosure. The apparatus, devices and/or components illustrated in FIGS. 1, 2, 3, 4, 5, 6, 7, and/or 8 may be associated with one or more of the steps described in FIG. 9.

While features of the present disclosure may have been discussed relative to certain embodiments and figures, all embodiments of the present disclosure can include one or more of the advantageous features discussed herein. In other words, while one or more embodiments may have been discussed as having certain advantageous features, one or more of such features may also be used in accordance with any of the various embodiments discussed herein. In similar fashion, while exemplary embodiments may have been discussed herein as device, system, or method embodiments, it should be understood that such exemplary embodiments can be implemented in various devices, systems, and methods.

Also, it is noted that at least some implementations have been described as a process that is depicted as a flowchart, a flow diagram, a structure diagram, or a block diagram. Although a flowchart may describe the steps as a sequential process, many of the steps can be performed in parallel or concurrently. In addition, the order of the steps may be re-arranged. A process is terminated when its steps are completed.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A stall cleaner, comprising:
   a frame;
   a deck with a first end and a second end opposite the first end, the deck pivotably coupled to the frame proximate the first end of the deck, wherein the deck includes a plurality of openings; and
   a drive mechanism coupled to the frame, the drive mechanism including a shaft with a first longitudinal end, a second longitudinal end opposite from the first longitudinal end, and a central axis, wherein the first longitudinal end and the second longitudinal end are each respectively coupled to the second end of the deck, and wherein the drive mechanism is configured to rotate a portion of the deck proximate the second end in a circular path around a radius relative to the central axis of the shaft.

2. The stall cleaner of claim 1, wherein the drive mechanism comprises:
   a motor coupled to the shaft to rotate the shaft about the central axis of the shaft.

3. The stall cleaner of claim 1, wherein the shaft passes through one or more bearings secured to the frame.

4. The stall cleaner of claim 1, further comprising a pivot arm including a first longitudinal end coupled to the deck proximate the first end of the deck and a second longitudinal end coupled to the frame, wherein the pivot arm pivots in response to rotation of the second end of the deck in the circular path.

5. The stall cleaner of claim 1, wherein the plurality of openings are sized and configured to retain objects larger than the openings on the deck and to enable objects smaller than the openings to pass through the openings.

6. The stall cleaner of claim 1, further comprising a plurality of casters coupled to the frame and positioned between the frame and a floor.

7. The stall cleaner of claim 1, wherein the deck is oriented at least substantially horizontally between the first end and the second end.

8. A cleaning device for cleaning a stall for animals, comprising:
   a frame;
   a motor coupled to the frame and configured to rotate a shaft about a central axis of the shaft;
   a deck coupled to both longitudinal ends of the shaft at a second end of the deck, wherein the deck is coupled to both longitudinal ends of the shaft to rotate about a circle having a predefined radius from the central axis of the shaft;
   a pivot arm pivotably coupled between the frame and the deck proximate a first end of the deck opposite from the second end.

9. The cleaning device of claim 8, wherein the pivot arm comprises:
   a first longitudinal end coupled to the deck; and
   a second longitudinal end coupled to the frame.

10. The cleaning device of claim 8, wherein the deck includes a plurality of openings sized and configured to retain objects larger than the openings on the deck and to enable objects on the deck that are smaller than the openings to pass through the openings.

11. The cleaning device of claim 8, further comprising a plurality of casters coupled to the frame and positioned between the frame and a floor.

12. The cleaning device of claim 8, wherein the deck is oriented at least substantially parallel to a floor on which it is positioned.

13. The cleaning device of claim 8, wherein the shaft is secured to the frame by one or more bearings coupled to the frame.

14. A method of making a stall cleaning device, comprising:
- coupling a first end of a deck to a frame to facilitate pivoting of the first end of the deck relative to the frame;
- coupling a drive mechanism to the frame, wherein the drive mechanism includes a shaft with two longitudinal ends and a central axis; and
- coupling a second end of the deck to both longitudinal ends of the shaft, wherein the drive mechanism is configured to rotate a portion of the second end of the deck in a circle about a predefined radius relative to the central axis of the shaft.

15. The method of claim 14, wherein coupling the drive mechanism to the frame comprises:
- coupling a drive mechanism including a motor coupled to the shaft to rotate the shaft about a central axis of the shaft.

16. The method of claim 15, further comprising:
coupling the shaft to the frame with one or more bearings.

17. The method of claim 14, wherein coupling the first end of the deck to the frame to facilitate pivoting of the first end of the deck relative to the frame comprises:
- pivotably coupling a first longitudinal end of a pivot arm proximate the first end of the deck; and
- pivotably coupling a second longitudinal end of the pivot arm to the frame,
- wherein the pivot arm pivots in response to rotation of the second end of the deck about the predefined radius.

18. The method of claim 14, wherein the deck includes a plurality of openings sized and configured to retain objects larger than the openings on the deck while object smaller than the openings pass through the openings.

19. The method of claim 14, further comprising:
coupling a plurality of casters to the frame.

20. The method of claim 14, wherein the deck is oriented to extend at least substantially horizontal between the first end and the second end.

* * * * *